Figure 1:
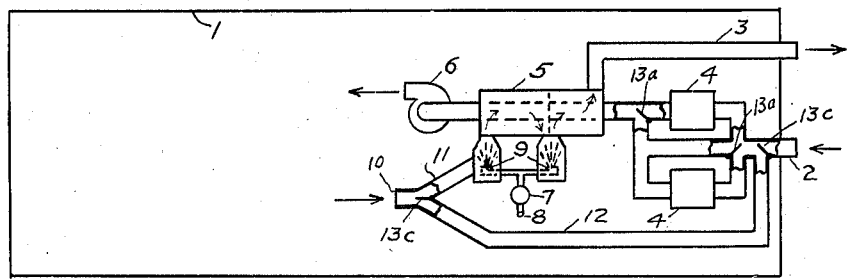

Oct. 20, 1936.    B. C. SHIPMAN    2,058,042

AIR COOLING AND CONDITIONING APPARATUS AND SYSTEM

Filed Nov. 7, 1932

Inventor
Bennet Carroll Shipman

Patented Oct. 20, 1936

2,058,042

UNITED STATES PATENT OFFICE 2,058,042

AIR COOLING AND CONDITIONING APPARATUS AND SYSTEM

Bennet Carroll Shipman, San Mateo, Calif., assignor to Servel, Inc., New York, N. Y., a corporation of Delaware Application November 7, 1932, Serial No. 641,591

12 Claims. (Cl. 62—171)

Heretofore in air cooling and conditioning practice the required removal of moisture from incoming or induction make-up air necessary for ventilation has been effected wholly by refrigeration or by adsorption. As this induction air may amount to twenty-five per cent or more of the air circulated and may also be of high humidity, the refrigeration or adsorption load thus imposed is a considerable portion of the total load which includes the removal of heat and moisture from the conditioned space. Also room conditioning only by individual units has been inadequate, for a cooling unit only as usually applied does not supply fresh air for ventilation, and even if fresh air be otherwise delivered, the removal of moisture from such air involves the same large proportion of the total load. Furthermore in the case of such individual room units the accumulation of condensed moisture to be disposed of and the cooling water supply and waste to be piped to and from the refrigerating or adsorbing unit constitute difficulty and expense both of installation and of operation.

This invention relates to types of apparatus which condense, or are adapted to condense when necessary, moisture from too humid air, as well as cool the air itself. It has for one of its objects increase of efficiency in this operation; for another of its objects, the economical production of small, portable units for single room use; for a third object, the elimination of plumbing connections from such units; for a fourth object the provision of adequate ventilation in a room conditioned by such a unit; and for other objects, improvements that will appear below.

To accomplish the first of these objects, I use the reject, or eduction, air, substantially equal in quantity to the fresh make-up, or induction, air required for ventilation or other purposes, to cool such induction air initially by passing said eduction air in thermal contact with the induction air in their respective passageways of a heat exchanger. As the rejected eduction air is from the conditioned space and therefore of a lower temperature and absolute humidity than the raw outside air in summer, it is suitable for this purpose when further humidified in its passage through said heat exchanger. This use of the rejected air adds practically nothing to the expense of operation but saves a large proportion of the load otherwise thrown on a refrigerating or adsorbing machine. By constant saturation of the rejected air in the passageways of the heat exchanger, its rise in temperature must take place along the saturation or dew point line, and therefore is capable of evaporating substantially as much moisture as conversely is condensed from the induction air in the other passageways of the heat exchanger, or, if not so much condensation be required, of increasing the temperature difference between the eduction and induction air. In either case refrigerating expense is saved.

To accomplish other objects, I use the moisture, condensed as above or by refrigeration, by re-evaporating it in the eduction passages of the heat exchanger, thus avoiding any accumulation of same and any necessity for plumbing connections to drain it or to cool the adsorber or refrigerating machine. By using the circulating air itself to perform these various functions, I secure complete ventilation.

Figure 2:
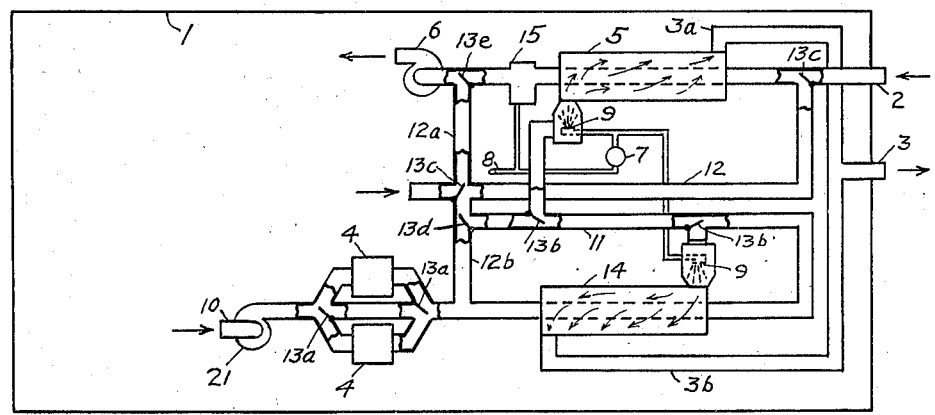
Figure 3:
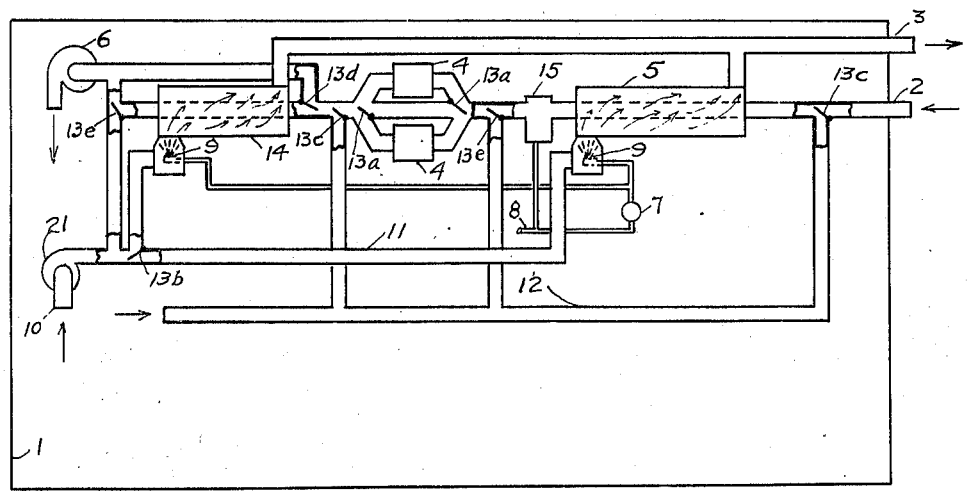

Figs. 1, 2, and 3 are diagrammatic views of various arrangements embodying this invention with the exception of Figure 1 which is a diagrammatic view of the arrangement of which the other diagrams are an improvement.

In Fig. 1, I illustrate diagrammatically the essential elements of an improved cooling arrangement described and claimed in my patent application, Serial No. 625,936, for the purpose of showing further improvements effected by this invention. In all figures, I indicates a conditionable space, within or without which may be placed the apparatus indicated; 2 is an induction duct for drawing in fresh, raw air; 3 is an eduction duct for rejecting air from the conditionable space to waste; 4 are duplicate dehumidifiers capable of adsorbing moisture in suitable adsorbents such as charcoal, activated alumina, silica gel, etc. Heating means for reactivating such adsorbents are not shown in the diagrams but are to be readily understood. 5 is a heat exchanger, such as described in my above said application, through one set of whose passageways air from the dehumidifiers, 4, passes to fan, 6, and into the conditionable space, 1. 10 is an eduction duct from such space, whence part of the eduction air may be sent through duct, 11, to the other set of passageways of heat exchanger, 5, and thence to rejection, and part through duct, 12, to the intake of the dehumidifiers for re-circulation, the damper, 13c, serving to adjust the proportions. Humidification of the eduction air is indicated by spray, 9, supplied by pump, 7, from a source 8.

In my said application, Serial No. 625,936, I disclose the method and increased effectiveness of re-saturating the eduction air a number of times by withdrawing it from the heat exchanger at the end of one section of the same, re-saturating it again, and returning it again to the next successive section of the same, and repeating this process as many times as might be desirable. However such a method, though superior to only an initial saturation of the eduction air, does not realize the maximum possible effectiveness of such rejected eduction air. If the spray heads, 9, supplied by pump, 7, be made to furnish spray finely atomized and in the direction of air flow and in sufficient quantity to penetrate all the way through the eduction passages of the heat exchanger to the outlet thereof, including what may be vaporized therein by the heat from the incoming induction air, it is evident that the rise in temperature of this eduction air will take place along the saturation line, because such air will always be saturated so long as there is any atomized moisture present in intimate contact with it, and its temperature at all times will be the wet bulb and dew point temperature, which are coincident in such a case. Therefore, as illustrated in Fig. 1, the mean temperature difference between induction and eduction air will be greater than with a series of successive saturations of the eduction air but with no entrained moisture therein.

With the arrangement of Fig. 1, however, the adsorbers, 4, must still remove all the moisture required to be removed from the raw outside air, which is at times quite heavy, thus requiring a relatively large amount of adsorbent and a corresponding amount of heat to reactivate it.

By this invention the amount of moisture to be removed either by adsorption or by refrigeration is greatly reduced. Referring first to Fig. 2, there are two heat exchangers instead of one as in Fig. 1. As before, 1 is a conditionable space; 2 an induction duct; 3 an eduction duct, combining the eduction ducts, 3a and 3b, from their respective heat exchangers, 5 and 14; 15 is a condensation trap chamber; 6, the induction fan; and 21, the eduction fan. It is not at all material where in the circuit these fans are placed, their only purpose being to cause the air circulation desired. 4 are the duplicate adsorbers, as before, but now placed in the eduction instead of the induction side of the circuit. This position is not essential and their location on the opposite side is illustrated in Fig. 3, but this position is preferable. The atomized moisture from spray heads, 9, is indicated by arrows within the heat exchangers as existing throughout the eduction passageways of both exchangers. Both sprays are supplied by pump, 7, which in turn is fed from condensation chamber, 15, or from source, 8, or from both. Dampers, 13b, adjust the relative quantities of the eduction air to be supplied to the respective exchangers. Recirculated air may be passed through duct, 12, as before, or through duct, 12a, or partly through both, controllable by dampers, 13c and 13e, depending on the temperature and relative humidity in the conditioned air desired.

Evidently in the case of high temperature and high humidity outdoors, if the conditioned space be assumed to be at optimum conditions, not only will the temperature and relative humidity of such space be lower than outdoors, but especially will the absolute humidity be greatly lower. Hence under these assumed conditions and in accordance with the diagrammatic arrangements of Figs. 2 and 3, the adsorbers, 4, will have to handle only a portion of the moisture existing in the outside air thus requiring less adsorbent and less heat to reactivate. Therefore the arrangement of Fig. 2 is an improvement over that of Fig. 1 wherein the location of the adsorbers represent present practice.

In order to prove that the optimum conditions in the conditionable space, 1, as assumed above, will be produced by the arrangement of Fig. 2 and the others, let the conditionable space, 1, be initially at the same temperature and relative humidity as outdoors, which of course it naturally will be. Let the fans, 6 and 21, and pump, 7, properly supplied with water, be started. The first educted air from fan, 21, is dried in adsorber, 4, thereby becoming heated, is passed through exchanger, 14, still hot, and is then saturated in spray, 9, and thereafter throughout both exchangers. Depending on its dryness and temperature when leaving adsorber, 4, it will on saturation come to the wet bulb temperature corresponding to that state, and pass through the eduction passageways of both exchangers with a constantly rising but always wet bulb temperature if continuously saturated throughout.

Part of this eduction air passes back, so saturated continuously, through heat exchanger, 14, to rejection. Therefore it immediately begins to cool the hot, dry air from the adsorber, 4, which is then delivered cooler to the sprays, 9. This colder air in turn saturates to a still lower temperature, and part again returning through the heat exchanger, 14, cools the hot, dry air from the adsorber still more, which hence saturates to a still lower temperature, thus regeneratively bringing the dried air to a final minimum temperature, whose limit would be the dew point of such air if there were no heat losses and no temperature split in the heat exchanger. In any event a close approach to this dew point can be realized, and the lowness of this point depends on the dryness of the air before entering the heat exchanger.

In fact this combination of a dehumidifier and a regenerative heat exchanger with means for circulating air through the combination and for continuously saturating the eduction air in the passages of the heat exchanger constitutes a refrigerating machine in every respect the equivalent of the conventional machine, and under some circumstances more economical in operation. The refrigerant in this case is water, and the low vapor pressure required for low temperature is secured by adsorption.

From the above it is evident that with a given initial humidity of air, the drier it leaves the adsorber the hotter it will be and the greater the amount of heat that may be extracted in the heat exchanger, 14, and the lower the temparture of the emerging cooled air, because the rejection temperature of the eduction air may be carried correspondingly higher, and the higher the temperature of rejection, the greater the amount of moisture from sprays evaporated and consequently the greater the amount of heat transferred in the exchanger to effect this evaporation.

The excess air from heat exchanger, 14, not required to cool itself, is available to cool the raw induction air through the heat exchanger, 5, or be directly mixed with it via ducts, 11 or 12a. Of low temperature and of low humidity, it may be saturated continuously throughout the passageways of exchanger, 5, and so rising in temperature along the dew point or saturation line. Thus it is capable of absorbing the heat released from the condensation of an equal amount of moisture from the raw induction air. Hence the induction air will have its temperature reduced and its moisture content lowered if such reduced temperature is below its dew point.

It is to be observed that this temperature reduction and condensation of moisture is effected by air on its way to rejection and therefore does not constitute any added expense of operation, as in the arrangement illustrated in Fig. 1, where all moisture extracted is adsorbed and therefore must again be desorbed by the expenditure of heat, or as in the case of using refrigeration to condense such moisture. On the contrary, in Fig. 2 and the others, it is evident that the moisture condensed in exchanger, 5, saves just that much expense either of adsorption or of refrigeration.

The induction air emerging from heat exchanger, 5, therefore is at a reduced temperature and usually saturated because below its former dew point. The condensed moisture is deposited in chamber, 15, for delivery to pump, 7, supplying the sprays, 9. Thus the condensed moisture is being constantly used to humidify the rejected air and cannot accumulate to require disposal by drains or drip pans.

In the natural temperature rise of the saturated air delivered into the space, 1, due to admixture with air already there and access of heat from leakage, people, apparatus, etc., its relative humidity will fall. In fact by means of duct, 12a, it can be mixed by recirculation so as to be delivered at the desired temperature and humidity. The fans indicated need not be placed in the circuit where shown. Any suitable places to effect the circulation of air required will do equally well, and in certain cases even, one fan only will do. Structural requirements are the determining factors in the location of fans.

In order to control relative humidity and temperature more fully, the recirculation duct, 12, may be connected to mix a quantity of fresh air with recirculated air and pass both through the heat exchanger, 5, or, as noted above, the recirculation duct, 12a, may be connected to similarly mix the airs but by-pass the heat exchanger. With the latter arrangement it is feasible and preferable to deliver the fresh air from the exchanger, 5, much colder and therefore with less absolute humidity, such that when it mixes with the warmer, recirculated air, the mixture will have the correct temperature. Any combination of temperature and relative humidity can be effected and made automatic by the installation of suitable instruments to control the various dampers, sprays, fans, adsorbers, air circulation, etc.

Thus the condition first assumed, namely, that the air of the conditioned space will be maintained at a lower temperature and a lower moisture content than the outside air, and therefore that a smaller amount of adsorbent and a smaller amount of heat to reactivate it will be required for a given cooling effect, is shown to be the actual fact.

Fig. 3 is a variation of Fig. 2. In certain cases atmospheric conditions in summer are such that a high humidity exists with a comparatively low temperature, such as 98% relative humidity and 80° F. temperature. In suitably drying this air in any conditioning system, the temperature is brought too low and therefore must be re-heated to the comfort zone. This heat can readily be supplied from the hot, dry air leaving the adsorbers, 4, by ducts, 12a and 12b, controlled by dampers, 13e and 13d, and mixing with the saturated air in duct, 2, before delivery into conditioned space, 1. Also it is sometimes desirable to have a low relative humidity in the conditionable space. In such cases air can be delivered by ducts, 11 and 12a, controlled by damper, 13e, from the cooled, dry air from heat exchanger, 14, to the saturated air in duct, 2. Fig. 3 is a variation of Fig. 2 for showing that adsorbers, 4, and heat exchanger, 14, do not necessarily have to be placed in the eduction circuit from the conditioned space, but merely after the heat exchanger, 5, so as to have a reduced amount of moisture to handle.

It is evident that my invention does not reside in a particular arrangement or sequence, but in any arrangement or sequence which produces the economy shown by condensing moisture from induction air by eduction air going to rejection, which evaporates and rejects all moisture condensed, which continuously humidifies eduction air in thermal contact with induction air, which cools air of low humidity by passing a portion of it continuously humidified in thermal contact with itself before such humidification, and which produces other improved results herein set forth.

Therefore I desire to secure by Letters Patent the following:

1. The method of conditioning air for a chamber which includes the steps of extracting moisture from air inducted thereinto by transferring heat from said air to air educted therefrom, further dehumidifying and cooling the air after said heat transfer, and thereafter educting and rehumidifying air from said chamber in thermal contact with the said inducted air.

2. The method of conditioning air for a chamber which includes the steps of inducting thereinto and educting therefrom a flow of air, extracting moisture from the inducted air by condensing said moisture by transferring heat from said inducted air to said educted air, further dehumidifying and cooling the air after said heat transfer, thereafter rehumidifying the air from said chamber with moisture previously extracted from air inducted thereinto, and educting such rehumidified air in thermal contact with the inducted air.

3. The method of conditioning air for a chamber which includes the steps of inducting outdoor air into said chamber and educting air from said chamber, dehumidifying the air educted from said chamber, recirculating a portion of this dehumidified air back into said chamber, and rehumidifying and passing the balance of this dehumidified air in thermal contact with the air educted from said chamber.

4. The method of conditioning air for a chamber which includes the steps of inducting raw air into said chamber and educting used air out of said chamber, of condensing moisture from the inducted air in transit to the chamber by transferring heat from said air to part of the air successively educted from the chamber, of further dehumidifying and cooling the air after said heat transfer, and of thereafter rehumidifying this air and educting it part in thermal contact with the inducted raw air and part in thermal contact with the said further dehumidified air.

5. The method of conditioning air for a room which comprises the steps of condensing water vapor from raw air inducted into such room by transfer of heat from said air to air educted from said room, recirculating the air of said room in conjunction with said inducted air, educting air from said room, removing additional water vapor from this educted air, and rehumidifying this educted air in thermal contact with the said raw inducted air.

6. The method of conditioning air for a chamber which comprises the steps of inducting raw air into and educting used air out of said chamber, of adsorbing moisture in a suitable adsorbent from such educted air, of cooling such dehumidified educted air by transfer of heat therefrom to a portion of itself successively rehumidified in mutual thermal contact therewith, and of recirculating another portion back into the said chamber in conjunction with the said inducted raw air.

7. In a conditioning system for maintaining desired air conditions in a given enclosed structure, induction means for passing air from outdoors into said structure, eduction means for passing air from said structure to outdoors again, heat exchange means forming part of said induction and eduction means, means for dehumidifying air after its induction passage through the heat exchange means, and means for rehumidifying the air during its eduction passage through the heat exchange means.

8. In a conditioning system for maintaining desired air conditions in a given enclosed structure, induction means for passing air from outdoors into said structure, eduction means for passing air out of said structure, heat exchange means forming part of said eduction means, means for dehumidifying air educted from said structure, means for dividing the dehumidified air educted through the said heat exchange means, means for recirculating one portion of said dehumidified air back to said structure, means for repassing another portion of said dehumidified air back through the said heat exchange means, and means for rehumidifying the said dehumidified air after its first passage through said heat exchange means.

9. In an air cooling apparatus, the combination of means for inducting air thereto and educting air therefrom, means for adsorbing moisture from the educted air, means for exchanging heat between the inducted air and the educted air, means for regulating the amount of educted air to be passed through the said heat exchanging means, and means for humidifying such educted air therein.

10. In the method of conditioning a room which includes removing moisture from room air by absorption, cooling said air by evaporation of water into at least a part thereof, educting air which has undergone treatment of said absorption and cooling steps, and inducting atmospheric air for the room, that improvement which consists in evaporating water into educted air in heat exchange relation with inducted air to decrease the load during said absorption and cooling steps.

11. In the method of conditioning a room which includes removing moisture from room air by absorption, cooling said air by evaporation of water into at least a part thereof, educting air which has undergone treatment of said absorption and cooling steps, and inducting atmospheric air for the room, that improvement which consists in evaporating water into educted air in heat exchange relation with inducted air to cause condensation of moisture in the inducted air, and utilizing the condensate in said step of evaporating water into educted air.

12. In a room air conditioning system, an absorber, a cooler, means for educting room air which has passed through said absorber and cooler, means for inducting atmospheric air for the room in heat exchange relation with the educted air, and means for evaporating water into the educted air during flow in said heat exchange relation to cause condensation of moisture in the inducted air and thereby decrease the load on said absorber and cooler.

BENNET CARROLL SHIPMAN.